(12) United States Patent
Powell

(10) Patent No.: US 12,099,905 B2
(45) Date of Patent: *Sep. 24, 2024

(54) SYSTEMS AND METHODS FOR MODEL-BASED IMAGE ANALYSIS

(71) Applicant: THE BOEING COMPANY, Chicago, IL (US)

(72) Inventor: Ryan Scott Powell, Broomfield, CO (US)

(73) Assignee: The Boeing Company, Arlington, VA (US)

( * ) Notice: Subject to any disclaimer, the term of this patent is extended or adjusted under 35 U.S.C. 154(b) by 117 days.

This patent is subject to a terminal disclaimer.

(21) Appl. No.: 17/870,153

(22) Filed: Jul. 21, 2022

(65) Prior Publication Data

US 2022/0358325 A1 Nov. 10, 2022

Related U.S. Application Data

(63) Continuation of application No. 16/836,775, filed on Mar. 31, 2020, now Pat. No. 11,436,450.

(51) Int. Cl.
| | |
|---|---|
| *G06V 10/82* | (2022.01) |
| *G06F 18/214* | (2023.01) |
| *G06F 18/2431* | (2023.01) |
| *G06N 20/00* | (2019.01) |
| *G06V 10/40* | (2022.01) |

(Continued)

(52) U.S. Cl.
CPC ........... *G06N 20/00* (2019.01); *G06F 18/214* (2023.01); *G06F 18/2431* (2023.01);
(Continued)

(58) Field of Classification Search
CPC ...... G06V 10/82; G06V 10/764; G06V 10/40; G06V 10/98; G06V 30/416; G06V 10/32; G06V 10/454; G06V 10/457; G06V 10/774; G06V 10/7788; G06V 20/176; G06V 20/56; G06V 20/58; G06V 30/19147; G06V 30/413; G06V 30/414; G06T 2207/20084; G06T 2207/20076; G06T 2207/20081; G06T 2207/30096; G06T 7/0012;
(Continued)

(56) References Cited

U.S. PATENT DOCUMENTS

| | | |
|---|---|---|
| 9,977,997 B2 | 5/2018 | Bai et al. |
| 10,387,773 B2 | 8/2019 | Yan et al. |

(Continued)

*Primary Examiner* — Ian L Lemieux
(74) *Attorney, Agent, or Firm* — Alleman Hall & Tuttle LLP

(57) ABSTRACT

A system for categorizing images is provided. The system is programmed to store a first training set of images. Each image of the first training set of images is associated with an image category of a plurality of image categories. The system is further programmed to analyze each image of the first training set of images to determine one or more features associated with each of the plurality of image categories and receive a second training set of images. The second training set of images includes one or more errors. The system is also programmed to analyze each image of the second training set of images to determine one or more features associated with an error category and generate a model to identify each of the image categories based on the analysis such that the model includes the error category in the plurality of image categories.

20 Claims, 7 Drawing Sheets

(51) Int. Cl.
*G06V 10/764* (2022.01)
*G06V 10/98* (2022.01)

(52) U.S. Cl.
CPC ............ *G06V 10/40* (2022.01); *G06V 10/764* (2022.01); *G06V 10/82* (2022.01); *G06V 10/98* (2022.01)

(58) Field of Classification Search
CPC ............ G06T 2200/04; G06T 2200/24; G06T 2207/10081; G06T 2207/10088; G06T 2207/10096; G06T 2207/20016; G06T 2207/30068; G06T 7/0016; G06N 20/00; G06N 3/08; G06N 3/045; G06N 20/10; G06N 20/20; G06F 18/2431; G06F 16/353; G06F 18/24; G06F 18/214
See application file for complete search history.

(56) References Cited

U.S. PATENT DOCUMENTS

| | | |
|---|---|---|
| 10,580,137 B2 | 3/2020 | Amit et al. |
| 10,607,120 B2 | 3/2020 | Bai et al. |
| 11,250,552 B1 * | 2/2022 | Padfield .............. G06F 18/2155 |
| 2017/0053211 A1 | 2/2017 | Heo et al. |
| 2018/0373980 A1 | 12/2018 | Huval |
| 2019/0102617 A1 | 4/2019 | Dorogy et al. |
| 2019/0238568 A1 | 8/2019 | Goswami et al. |
| 2020/0026953 A1 | 1/2020 | Bai et al. |
| 2020/0117718 A1 | 4/2020 | Lundberg et al. |
| 2020/0357117 A1 | 11/2020 | Lyman et al. |
| 2020/0373003 A1 | 11/2020 | Lyman et al. |
| 2021/0264025 A1 | 8/2021 | Givental et al. |

* cited by examiner

SYSTEMS AND METHODS FOR MODEL-BASED IMAGE ANALYSIS

CROSS-REFERENCE TO RELATED APPLICATIONS

This application is a continuation of U.S. patent application Ser. No. 16/836,775, filed Mar. 31, 2020, entitled "SYSTEMS AND METHODS FOR MODEL-BASED IMAGE ANALYSIS," the entire contents and disclosure of which is incorporated herein by reference in its entirety.

BACKGROUND

The field of the present disclosure relates generally to analyzing images and, more specifically, to analyzing images to categorize and determine issues with those images.

Evaluation of images is labor-intensive process and may be dependent on subject matter expertise. The more complicated the image and the more potentially expensive that having errors on an image are, the more careful each image needs to be carefully analyzed. Trained individuals may have to spend significant time analyzing images for potential flaws and/or errors. For systems where multiple images need to be analyzed, the process may become extremely time-intensive. In addition, some known image evaluation systems rely on rudimentary automated checks, which are only able to identify a few basic error conditions. Accordingly, it is advisable to determine additional systems for analyzing images for errors.

BRIEF DESCRIPTION

In one aspect, a system for categorizing images is provided. The system includes a computing device having at least one processor in communication with at least one memory device. The at least one processor is programmed to store a first training set of images. Each image of the first training set of images is associated with an image category of a plurality of image categories. The at least one processor is also programmed to analyze each image of the first training set of images to determine one or more features associated with each of the plurality of image categories. The at least one processor is further programmed to receive a second training set of images. The second training set of images includes one or more errors. In addition, the at least one processor is programmed to analyze each image of the second training set of images to determine one or more features associated with an error category. Moreover, the at least one processor is programmed to generate a model to identify each of the image categories based on the analysis such that the model includes the error category in the plurality of image categories.

In another aspect, a method for categorizing images is provided. The method is implemented by a computer device having at least one processor in communication with at least one memory device. The method includes storing a first training set of images. Each image of the first training set of images is associated with an image category of a plurality of image categories. The method also includes analyzing each image of the first training set of images to determine one or more features associated with each of the plurality of image categories. The method further includes receiving a second training set of images. The second training set of images includes one or more errors. In addition, the method includes analyzing each image of the second training set of images to determine one or more features associated with an error category. Moreover, the method includes generating a model to identify each of the image categories based on the analysis such that the model includes the error category in the plurality of image categories.

In a further aspect, a computer device for categorizing images is provided. The computer device includes at least one processor in communication with at least one memory device. The at least one processor is programmed to store a first training set of images. Each image of the first training set of images is associated with an image category of a plurality of image categories. The at least one processor is also programmed to analyze each image of the first training set of images to determine one or more features associated with each of the plurality of image categories. The at least one processor is further programmed to receive a second training set of images. The second training set of images includes one or more errors. In addition, the at least one processor is programmed to analyze each image of the second training set of images to determine one or more features associated with an error category. Moreover, the at least one processor is programmed to generate a model to identify each of the image categories based on the analysis such that the model includes the error category in the plurality of image categories. Furthermore, the at least one processor is programmed to receive an image. The image includes a metadata image category. In addition, the at least one processor is also programmed to execute the model to analyze the received image. In addition, the at least one processor is further programmed to identify an image category of the plurality of image categories for the image based on the execution of the model. Moreover, the at least one processor is also programmed to compare the identified image category to the metadata image category to determine if there is a match. If there is a match, the at least one processor is programmed to approve the image. If there is not a match, at least one processor is programmed to flag the image for further review.

DETAILED DESCRIPTION

Figure 1:
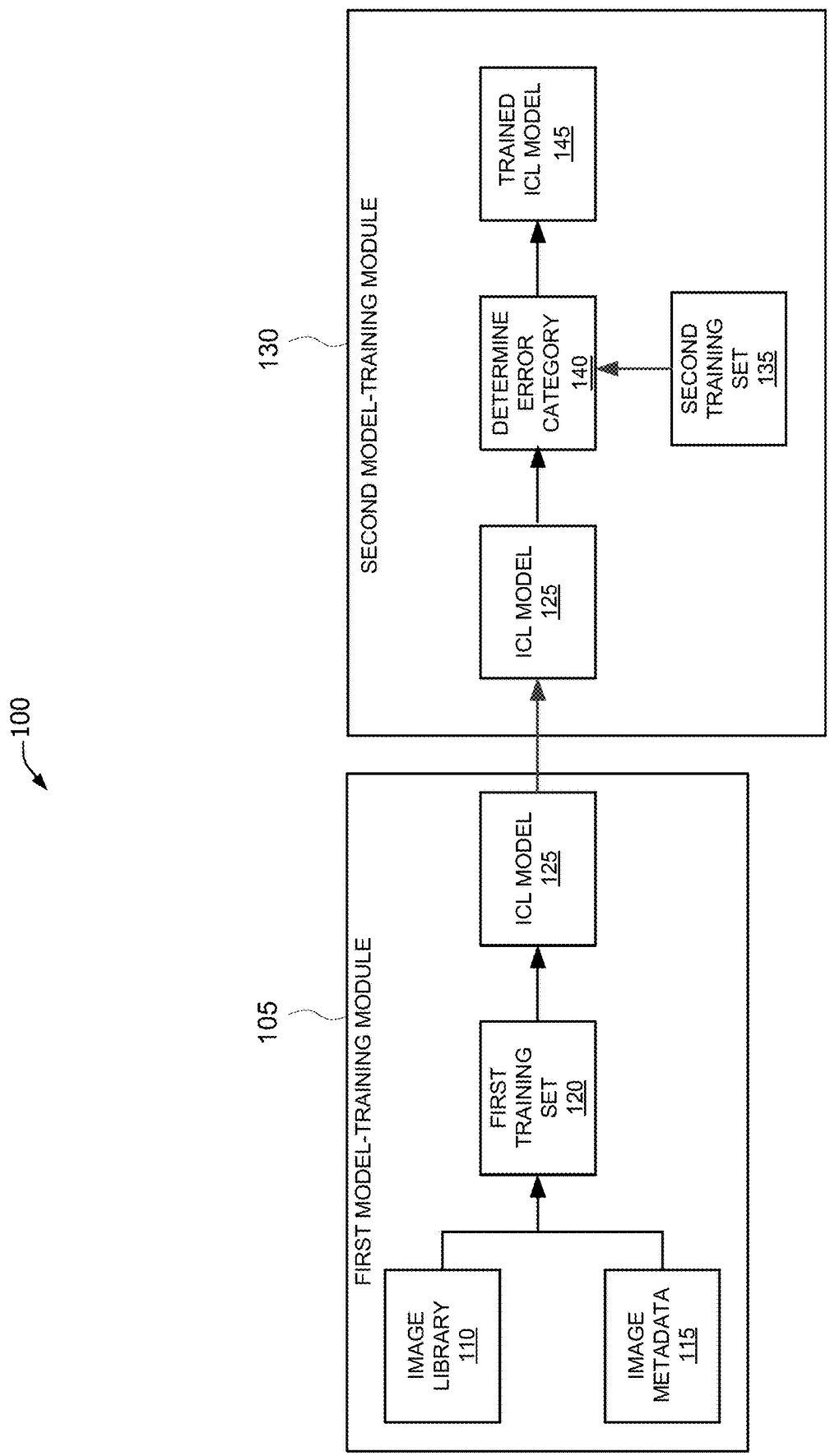
FIG. 1 illustrates a block diagram of a system for training an image categorization and learning (ICL) model in accordance with one embodiment of the present disclosure.

The implementations described herein relate to systems and methods for analyzing images and, more specifically, to analyzing images to categorize and determine issues with those images. In particular, an image categorization and learning (ICL) model is executed by a computing device to (1) learn to identify the categories associated with a plurality of types of images; (2) learn to identify errors in the plurality of types of images; and (3) identify a category for an image and one or more errors to that image based on the identified class.

In the exemplary embodiment, the ICL model is first trained using a labeled training set of images, where the images have labels that identify the category of image. The ICL uses the features of those images to determine how to recognize different types of images. When the ICL model is trained to categorize images, the ICL model is then used to receive images and identify the image category based on the image itself. Next, the ICL model is trained to identify issues and/or errors with the images. In this phase, the ICL model receives images with errors and is trained to put those images in an error category.

During normal use of the ICL model, the model receives an image with a known image category. For example, the image category may be stored in the metadata of the image. The ICL model determines the image category based on the image and compares the determined image category to the one stored in the metadata. If there is a match, then the system moves on to the next image. If there is a discrepancy, the system submits the image and determined image category to a user for review. If the image has an error, then the ICL model puts the image in the error image category. In at least one embodiment, the ICL model is trained to identify an image category for an image and one or more errors in the image based on that image category.

Described herein are computer systems such as the ICL computer devices and related computer systems. As described herein, all such computer systems include a processor and a memory. However, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application-specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS' include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

In another embodiment, a computer program is provided, and the program is embodied on a computer-readable medium. In an example embodiment, the system is executed on a single computer system, without requiring a connection to a server computer. In a further example embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, CA). In yet a further embodiment, the system is run on a Mac OS® environment (Mac OS is a registered trademark of Apple Inc. located in Cupertino, CA). In still yet a further embodiment, the system is run on Android® OS (Android is a registered trademark of Google, Inc. of Mountain View, CA). In another embodiment, the system is run on Linux® OS (Linux is a registered trademark of Linus Torvalds of Boston, MA). The application is flexible and designed to run in various different environments without compromising any major functionality.

In some embodiments, the system includes multiple components distributed among a plurality of computer devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The systems and processes are not limited to the specific embodiments described herein. In addition, components of each system and each process can be practiced independent and separate from other components and processes described herein. Each component and process also can be used in combination with other assembly packages and processes.

The patent claims at the end of this document are not intended to be construed under 35 U.S.C. § 112(f) unless traditional means-plus-function language is expressly recited, such as "means for" or "step for" language being expressly recited in the claim(s).

For the purposes of this discussion, terminal charts will be used as an example of the type of images that may be categorized and analyzed. Terminal charts are maps for pilots to understand procedures for flying into or out of an airport. Categories for terminal charts may include, but are not limited to, approach, arrival, departure, and airport map. In the exemplary embodiment, terminal charts are vector-based graphic files. Terminal charts may be generated by hand or through the use of automated graphic generation programs, such as by conversion from raster graphics, scanned images, or previous version from other programs.

FIG. 1 illustrates a block diagram of a system 100 for training an image categorization and learning (ICL) model 125 in accordance with one embodiment of the present disclosure.

In the exemplary embodiment, a first model-training module 105 is used for the initial training of the ICL model 125. The ICL model 125 is first trained using an image library 110 containing a plurality of images and image metadata 115 associated with the plurality of images. In the exemplary embodiment, the plurality of images in the image library 110 may be any type of image that could be broken into categories. This may include, but is not limited to, terminal charts for aircraft, topographical maps, medical images (i.e., x-rays, electrocardiograms, sonograms), and photographs. Images may include vector-based graphics or raster graphics. The image metadata 115 may include, but is not limited to, name, effective date/date taken, image format, and image category. The image library 110 and the image metadata 115 are combined to generate a first training set 120. In the exemplary embodiment, the first training set 120 includes a large number of images from each category or type. For example, the first training set 120 may include over 10,000 to over 100,000 images covering the different image categories.

In the first training set 120, each image is associated with an image category. The first model training module 105 uses the first training set 120 to train the ICL model 125 in categorizing images into one of the image categories. In the exemplary embodiment, the first model training module 105 knows the image category for each image in the training set, so the first model training module 105 is able to compare different images of the same category and different images of different categories to determine which features in each image is indicative of each image category to train the ICL model 125. The ICL model 125 determines what are common features of a particular category of image, such as an approach chart, which makes the approach chart distinct from other types of images, such as a departure chart. These features may include small subtleties of the image, such as in the placement of a logo or index number, the flow of lines, the sizes of numbers, the directions of arrows, and/or any number of additional features.

In some embodiments, images of the same category may have some different features, for example, a type of terminal chart that has changed over time (i.e. reformatted) or photographs from different types and different eras of cameras.

After the first training of the ICL model 125, the ICL model 125 is capable of receiving an image and determining which, if any, of the image categories that the image should be labeled as. Examples of image categories include, but are not limited to, indoors image, outside image, type of terminal chart (approach, arrival, or departure), topographical map type, medical image type and/or orientation, artwork type (painting, drawing, print, decorative arts, or sculpture), artwork theme (portrait, landscape, religious, or abstract), artwork style (Modernism, Cubism, Surrealism, Expressionism, and Impressionism), categorization based on subject matter (i.e., mountains, people, sporting event), vector-based graphics, raster graphics, or any other categorization as needed.

Next, the ICL model 125 is trained a second time by the second model-training module 130, this time with images with errors. In the exemplary embodiment, a second training set 135 is provided. In the exemplary embodiment, the second training set 135 includes a plurality of images with one or more errors. These errors may include, but are not limited to, rendering errors (wherein the image is not properly rendered), missing items or features in the image, duplicate items or features in the image, items covered up by other items, blank images, all white or all black images, line rendering is too heavy or too light, misclassification of image category, misspellings, lower resolution than expected, blurred features or sections, and inverted colors. In some embodiments, the second training set 135 only contains images with errors. In other embodiments, the second training set 135 includes images with errors and images without errors.

For each image in the second training set 135, the ICL model 125 receives the image and categorizes the image. In the exemplary embodiment, the second model-training module 130 trains the ICL model to recognize a new category of image, an error category. In some embodiments, the error category is a simple image category that represents that there is an error in the image. In other embodiments, the error category includes a plurality of sub-categories that indicate the type of error. For example, some sub-categories may indicate a title error, a rendering error, or a misclassification error. Some sub-categories may be associated with different image categories. For example, the sub-category may indicate that the image is an arrival chart with an error or even an arrival chart with a title error. The second model-training module 130 determines 140 the error category for each image with an error and trains the ICL model 125 to recognize those error categories.

The second model-training module 130 updates the ICL model 125 into a trained ICL model 145. In some embodiments, the ICL model 125 is trained to be updated into the trained ICL model 145. In other embodiments, the trained ICL model 145 is generated from the ICL model 125 and the second training set 135. In still further embodiments, the trained ICL model 145 is generated from scratch using the information in the ICL model 125 and the second training set 135.

In the exemplary embodiment, the second model training module 130 and second training set 135 are configured to train the ICL model 125 to recognize errors and generate an error category. This error category may include images that are not categorized properly, not rendered properly, or otherwise do not fit into any of the categories that the ICL model 125 was trained to recognize by the first model-training module 105. In some embodiments, the ICL model 125 is further trained to identify different error types and report those error types when they are contained in an image. In one example, the ICL model 145 may recognize an image as an arrival chart, but be able determine that one or more errors are contained in that chart, such as some of the text is fuzzy. This addition of an error category allows the ICL model 145 to not only identify general errors through category mismatch, but to identify potential errors through category discrepancies.

While the above describes only a first training set 120 and a second training set 135, system 100 may include a plurality of training sets. The system 100 may use different training sets to recognize different types of errors and error categories. For example, the system 100 may include a training set just to train the ICL model 125 in regards to misclassification errors. In addition, in some embodiments, the first training set 120 and the second training set 135 may be combined into a single training set and the first model-training module 105 and the second model-training module 130 may be combined into a single model-training module.

In some further embodiments, the trained ICL model 145 may also be trained to recognize individual objects or features in an image as errors. This may allow the trained ICL model 145 to categorize errors into sub-categories based on the individual errors.

Examples of error types include, but are not limited to, rendering errors (where all or a portion of the image did not render, such as extra white space or black space), fuzzy text, fuzzy lines, missing features, extraneous features, no known category, misclassification, incorrect orientation of image, incorrect orientation of features, incorrect text, incorrect lines, incorrect resolution, incorrect size, inverted color scheme, incorrect color scheme, and/or any other error based on the use case.

In some embodiments, the trained ICL model 145 is trained to recognize an image and categorize that image based on a portion of that image, rather than having to analyze the entire image. In these embodiments, the trained ICL model 145 is trained to recognize features of the image and analyze whether or not those features are present and correct to categorize the image.

Figure 2A:
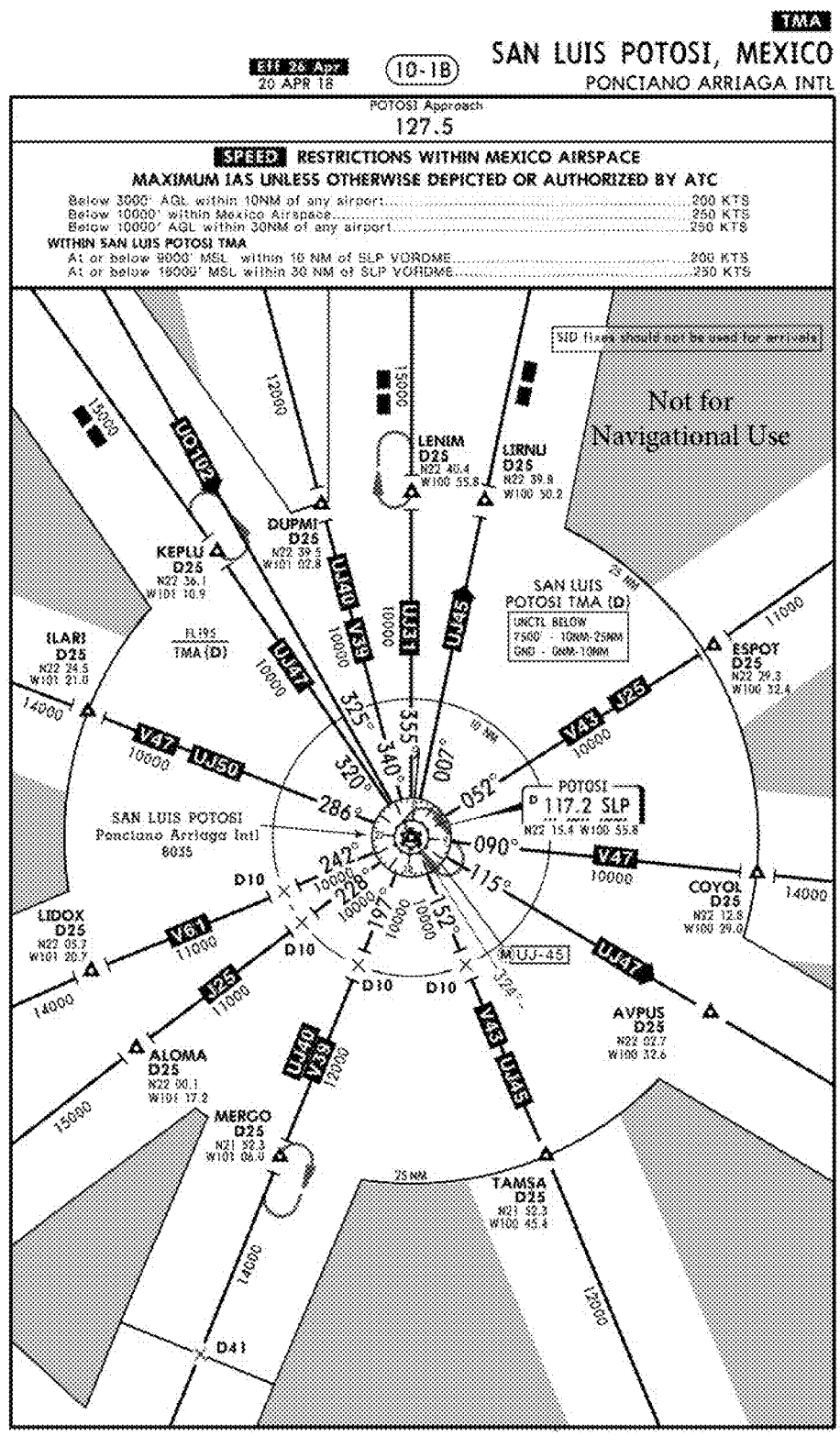
FIG. 2A illustrates an exemplary clean image that may be used to train the ICL model shown in FIG. 1.
Figure 2B:
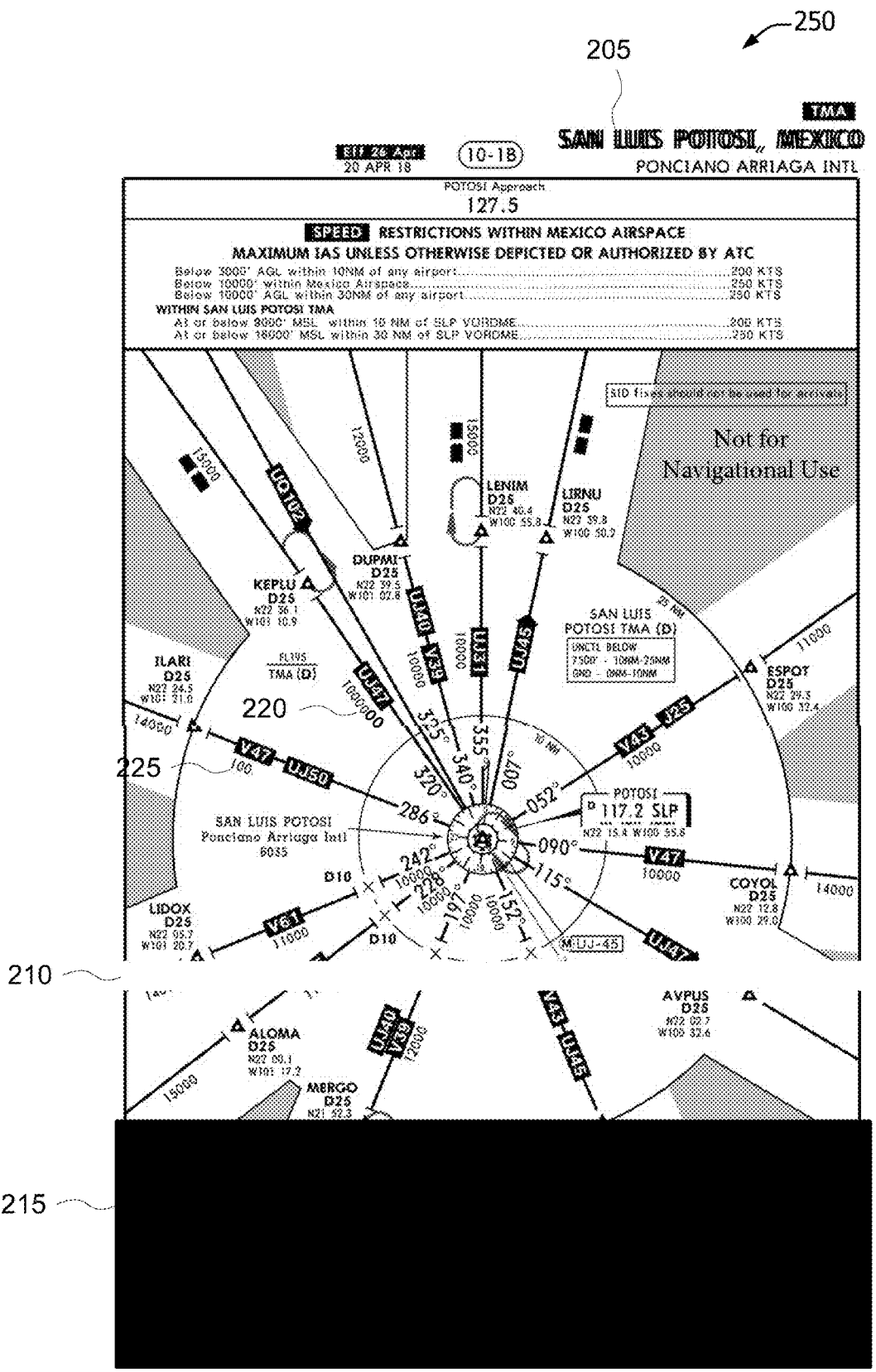
FIG. 2B illustrates an exemplary image with errors that may be detected by the ICL model shown in FIG. 1.

FIG. 2A illustrates an exemplary clean image 200 that may be used to train the ICL model 125 (shown in FIG. 1). FIG. 2B illustrates an exemplary image 250 with errors that may be detected by the ICL model 125 (shown in FIG. 1). Example errors shown in FIG. 2A include title errors 205, where the title of the chart is listed twice and overlaps to create fuzzy lettering. The image 250 also includes two rendering errors 210 and 215. In this case, rendering error 210 is a white line, where the image 250 did not completely render or skipped over information. Rendering error 215 is a black space where the end of the image 250 did not finish rendering the image, such as through a corruption of the image file. Typo Errors 220 and 225 show where numbers have been removed or added. In some embodiments, the ICL model 125 is capable of analyzing the content of the image 250 and determining if there are errors. Such as in an arrival chart where the numbers increase where they should decrease or vice versa. The errors 205-225 shown in here are only examples, and the ICL model 125 may be configured to detect and identify other errors based on its training, such as those errors contained in the second training set 135 or based on which features the ICL model 125 uses to determine each classification.

Figure 3:
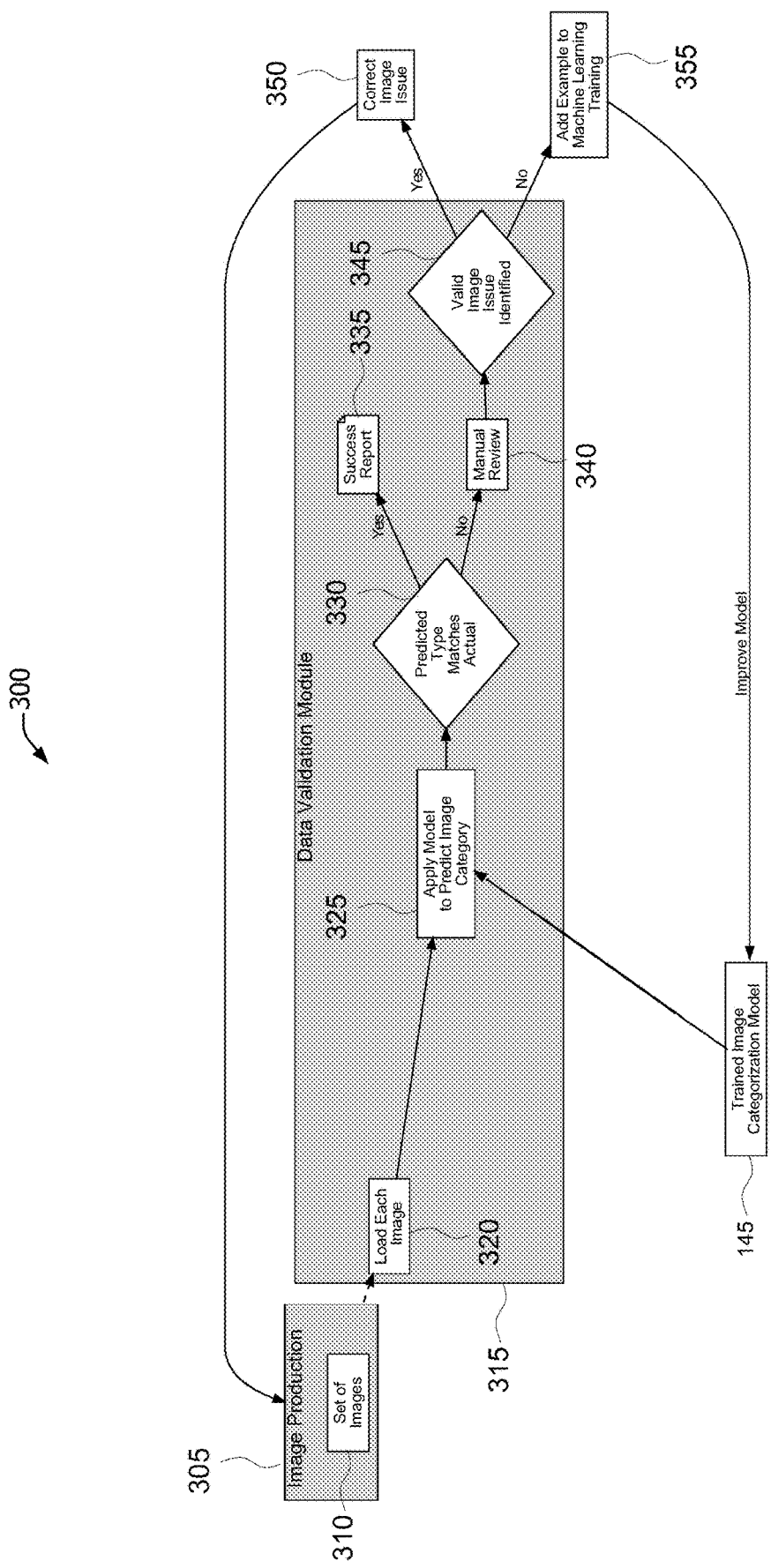
FIG. 3 illustrates a block diagram of a system for using a trained image categorization and learning (ICL) model that has been trained using the system 100 shown in FIG. 1.

FIG. 3 illustrates a block diagram of a system 300 for using a trained image categorization and learning (ICL) model 145 that has been trained using the system 100 (both shown in FIG. 1).

In the exemplary embodiment, image production 305 produces a set of images 310. In some embodiments, image production 305 is a conversion program that converts files from one file type to another file type. In other embodiments, image production 305 is a communications program that receives the set of images 310 that have been transmitted from another computer device. In still further embodiments, image production 305 creates the set of images 310. In some of these embodiments, image production 305 creates the image from one or more datasets, such as in the situation where the set of images 310 are procedurally created. In additional embodiments, image production 305 includes one or more users that create or modify the set of images 310.

In the exemplary embodiment, a data validation module 315 is programmed to use the trained image categorization and learning (ICL) model 145 to categorize and analyze the set of images 310. The data validation module 315 loads 320 each image in the set of images 310. In some embodiments, the data validation module 315 loads 320 and validates each image serially. In other embodiments, the data validation module 315 may load 320 and validate multiple images in parallel based on available computing resources.

The data validation module 315 applies 330 the trained ICL model 145 to the image to categorize the image. In the exemplary embodiment, the trained ICL model 145 analyzes the features of the image to determine which image category that the image should be categorized as. In the exemplary embodiment, the image includes metadata that includes the image category. The determined image category is compared 330 to the metadata image category. If the determined image category matches the metadata image category, then the data validation module 315 reports success 335 and continues to the next image. In some embodiments, the trained ICL model 145 may classify the image in the same image category as the metadata image category, but also list that the image has an error. In some other embodiments, the trained ICL model 145 may only classify the image as being in an error image category. In either of these cases, the image is flagged for further review 340.

In the exemplary embodiment, there are three types of errors that the trained ICL model 145 may identify. First, the trained ICL model 145 will identify when there is a discrepancy between the predicted image category (as determined by the trained ICL model 145) and the actual image category (such as in the metadata). Next, the trained ICL model 145 will identify when the image does not fit into any image category (such as the wrong file being in the wrong place). And finally, the trained ICL model 145 will identify when an image matches a known error category.

In some embodiments, the further review 340 is performed by one or more users. In other embodiments, the further review 340 is performed by another module, model, or computer device. The further review 340 determines 345 if a valid image issue has been identified. For example, if the further review 340 determines 345 that one or more of the errors 205-225 (shown in FIG. 2B) appear in the image, then the data validation module 315 would mark 350 that image as needing correction. In some embodiments, the data validation module 315 would transmit the marked image back to the image production 305 for correction. If the further review 340 determines that the image is valid, then the data validation module 315 may transmit the image and metadata to update the trained ICL model 145.

In some further embodiments, ICL model 125 (shown in FIG. 1) may be trained by system 300 to be updated into trained ICL model 145.

For example, the system 300 may be used to validate terminal chart images. In one example, a computer program may convert terminal charts from one format to another format. In this example, the system 300 may be used to validate each of the terminal charts after they have been converted. The system 300 may then detect when there are problems with any of the converted terminal charts. This drastically speeds up and improves the accuracy of having each terminal chart be reviewed manually. In another example, the system 300 may be used to validate terminal charts after they have been ported or transmitted to another computer. For example, a plurality of terminal charts may be transmitted from a ground based computer to a computer onboard an aircraft. The system 300 is then used to confirm that all of the terminal charts transferred over correctly. This allows the pilots or navigators of the aircraft to validate that none of the terminal charts have issues from the transfer between computers or over computer networks. Otherwise, the pilots or navigators would have to manually inspect each terminal chart, which would require significant amounts of pilot time to ensure the accuracy of the terminal charts.

Figure 4:
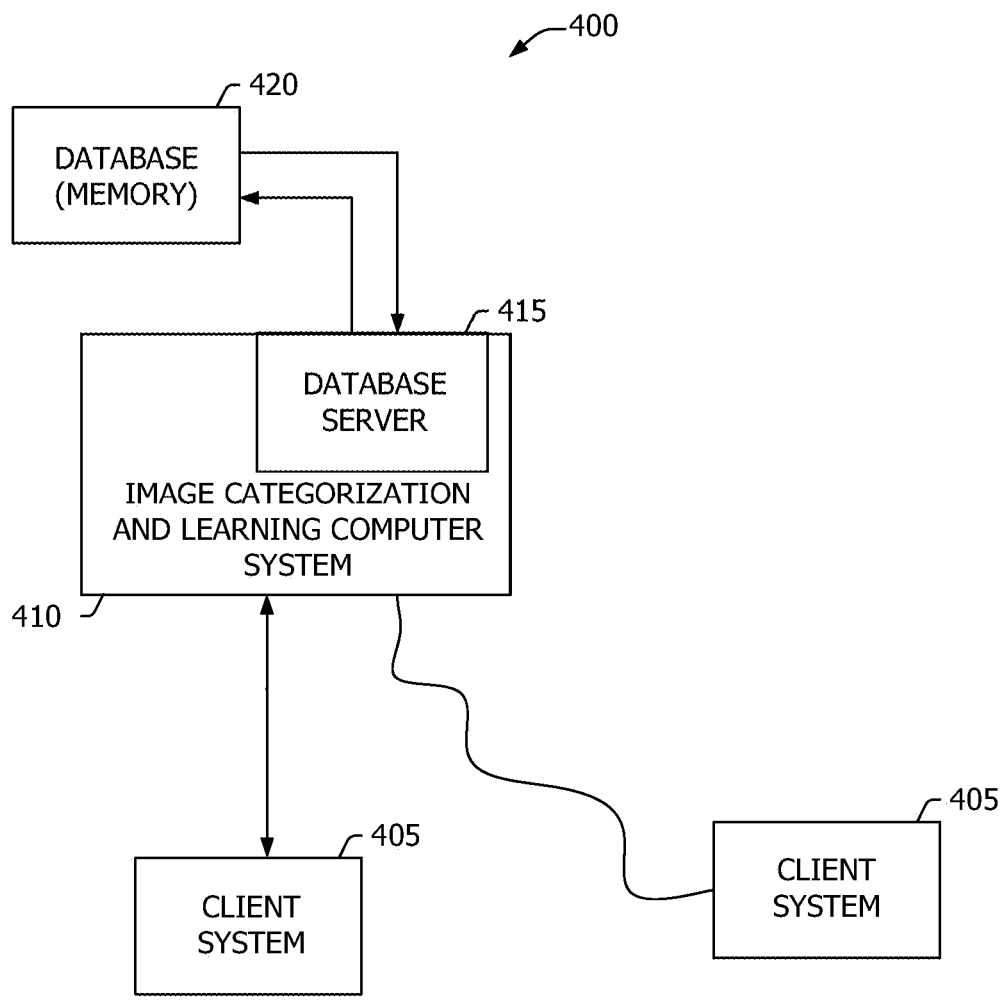
FIG. 4 is a simplified block diagram of an example system for executing the systems shown in FIGS. 1 and 3.

FIG. 4 is a simplified block diagram of an example system 400 for executing the systems 100 and 300 (shown in FIGS. 1 and 3). In the example embodiment, the system 400 is used for analyzing image data to detect features in the images to identify an image category for the image. In some embodiments, the system 400 is also used to analyze the images for one or more errors. In addition, the system 400 is a real-time image analyzing and classifying computer system that includes an image classification and learning (ICL) computer device 410 (also known as an ICL server) configured to analyze and categorize images.

As described below in more detail, the ICL server 410 is programmed to analyze images to identify classifications for them. In addition, the ICL server 410 is programmed to train the ICL model 125 (shown in FIG. 1). In some embodiments, the ICL server 410 is programmed to execute one or more of first model training module 105, second model training module 130 (both shown in FIG. 1), image production 305, and data validation module 315 (both shown in FIG. 3). The ICL server 410 is programmed to a) execute a model for categorizing images into an image category of a plurality of image categories; b) receive an image, wherein the image includes an image category of the plurality of image categories; c) identify an image category for the image based on the model; d) compare the identified image category to the included image category to determine if there is a match; e) if there is a match, approve the image; and f) if there is not a match, flag the image for further review.

In the example embodiment, client systems 405 are computers that include a web browser or a software application, which enables client systems 405 to communicate with ICL server 410 using the Internet, a local area network (LAN), or a wide area network (WAN). In some embodiments, the client systems 405 are communicatively coupled to the Internet through many interfaces including, but not limited to, at least one of a network, such as the Internet, a LAN, a WAN, or an integrated services digital network (ISDN), a dial-up-connection, a digital subscriber line (DSL), a cellular phone connection, a satellite connection, and a cable modem. Client systems 405 can be any device capable of accessing a network, such as the Internet, including, but not limited to, a desktop computer, a laptop computer, a personal digital assistant (PDA), a cellular phone, a smartphone, a tablet, a phablet, or other web-based connectable equipment. In at least one embodiment, one or more client systems 405 are associated with the image production 305.

A database server 415 is communicatively coupled to a database 420 that stores data. In one embodiment, the database 420 is a database that includes one or more of the first training set 120, the second training set 130, ICL model 125, trained ICL model 145 (all shown in FIG. 1), and the set of images 310 (shown in FIG. 3). In some embodiments, the database 420 is stored remotely from the ICL server 410. In some embodiments, the database 420 is decentralized. In the example embodiment, a person can access the database 420 via the client systems 405 by logging onto ICL server 410.

Figure 5:
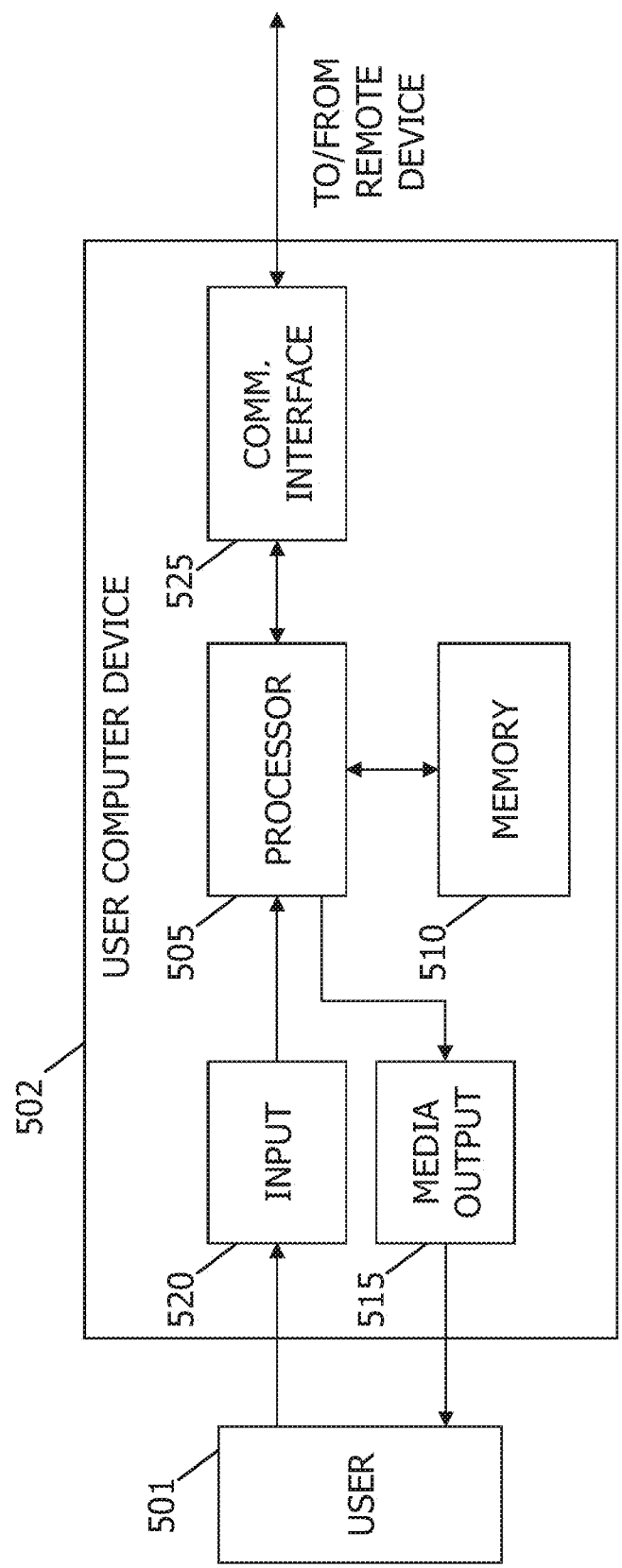
FIG. 5 illustrates an example configuration of a client computer device shown in FIG. 4, in accordance with one embodiment of the present disclosure.

FIG. 5 illustrates an example configuration of client system 405 (shown in FIG. 4), in accordance with one embodiment of the present disclosure. User computer device 502 is operated by a user 501. The user computer device 502 may include, but is not limited to, the image production 305 (shown in FIG. 1) and the client systems 405 (shown in FIG. 4). The user computer device 502 includes a processor 505 for executing instructions. In some embodiments, executable instructions are stored in a memory area 510. The processor 505 may include one or more processing units (e.g., in a multi-core configuration). The memory area 510 is any device allowing information such as executable instructions and/or transaction data to be stored and retrieved. The memory area 510 may include one or more computer-readable media.

The user computer device 502 also includes at least one media output component 515 for presenting information to the user 501. The media output component 515 is any component capable of conveying information to the user 501. In some embodiments, the media output component 515 includes an output adapter (not shown) such as a video adapter and/or an audio adapter. An output adapter is operatively coupled to the processor 505 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some embodiments, the media output component 515 is configured to present a graphical user interface (e.g., a web browser and/or a client application) to the user 501. A graphical user interface may include, for example, an interface for viewing the image category associated with one or more images. In some embodiments, the user computer device 502 includes an input device 520 for receiving input from the user 501. The user 501 may use the input device 520 to, without limitation, select an image to view the analysis of. The input device 520 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of the media output component 515 and the input device 520.

The user computer device 502 may also include a communication interface 525, communicatively coupled to a remote device such as the ICL server 410 (shown in FIG. 4). The communication interface 525 may include, for example, a wired or wireless network adapter and/or a wireless data transceiver for use with a mobile telecommunications network.

Stored in the memory area 510 are, for example, computer-readable instructions for providing a user interface to the user 501 via the media output component 515 and, optionally, receiving and processing input from the input device 520. A user interface may include, among other possibilities, a web browser and/or a client application. Web browsers enable users, such as the user 501, to display and interact with media and other information typically embedded on a web page or a website from the ICL server 410. A client application allows the user 501 to interact with, for example, the ICL server 410. For example, instructions may be stored by a cloud service, and the output of the execution of the instructions sent to the media output component 515.

The processor 505 executes computer-executable instructions for implementing aspects of the disclosure. In some embodiments, the processor 505 is transformed into a special purpose microprocessor by executing computer-executable instructions or by otherwise being programmed.

Figure 6:
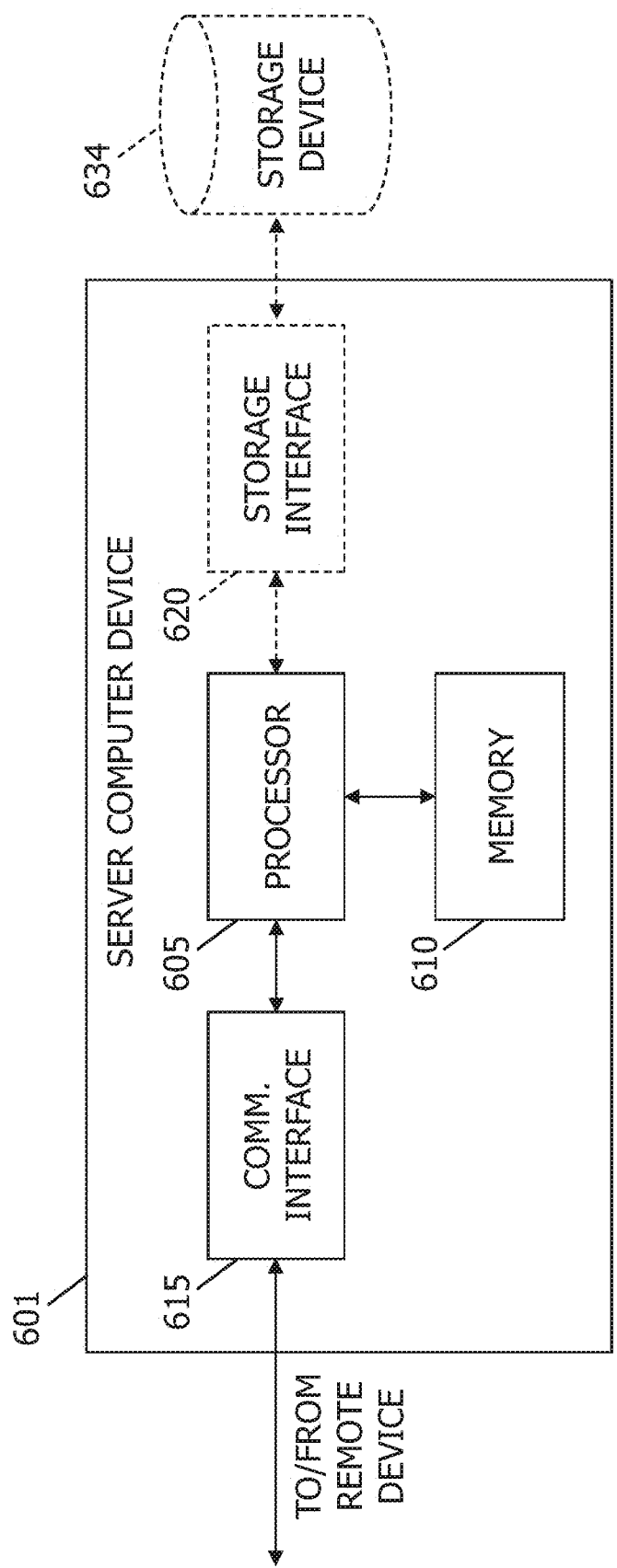
FIG. 6 illustrates an example configuration of the server system shown in FIG. 4, in accordance with one embodiment of the present disclosure.

FIG. 6 illustrates an example configuration of the server system 410 (shown in FIG. 4), in accordance with one embodiment of the present disclosure. Server computer device 601 may include, but is not limited to, the system 100 (shown in FIG. 1), the system 300, the image production 305 (both shown in FIG. 3), the database server 415, and the ICL server 410 (both shown in FIG. 4). The server computer device 601 also includes a processor 605 for executing instructions. Instructions may be stored in a memory area 610. The processor 605 may include one or more processing units (e.g., in a multi-core configuration).

The processor 605 is operatively coupled to a communication interface 615 such that the server computer device 601 is capable of communicating with a remote device such as another server computer device 601, another ICL server 410, or the client system 405 (shown in FIG. 4). For example, the communication interface 615 may receive requests from the client system 405 via the Internet, as illustrated in FIG. 4.

The processor 605 may also be operatively coupled to a storage device 634. The storage device 634 is any computer-operated hardware suitable for storing and/or retrieving data, such as, but not limited to, data associated with the database 420 (shown in FIG. 4). In some embodiments, the storage device 634 is integrated in the server computer device 601. For example, the server computer device 601 may include one or more hard disk drives as the storage device 634. In other embodiments, the storage device 634 is external to the server computer device 601 and may be accessed by a plurality of server computer devices 601. For example, the storage device 634 may include a storage area network (SAN), a network attached storage (NAS) system, and/or multiple storage units such as hard disks and/or solid state disks in a redundant array of inexpensive disks (RAID) configuration.

In some embodiments, the processor 605 is operatively coupled to the storage device 634 via a storage interface 620. The storage interface 620 is any component capable of providing the processor 605 with access to the storage device 634. The storage interface 620 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 605 with access to the storage device 634.

The processor 605 executes computer-executable instructions for implementing aspects of the disclosure. In some embodiments, the processor 605 is transformed into a special purpose microprocessor by executing computer-executable instructions or by otherwise being programmed. For example, the processor 605 is programmed with instructions.

At least one of the technical solutions provided by this system to address technical problems may include: (i) improved analysis of images; (ii) increased categorization of images; (iii) improved speed of analysis of images; (iv) more accurate classification; and (v) more accurate error analysis of images.

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, a reinforced or reinforcement learning module or program, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as images, object statistics and information, historical categorizations, and/or actual errors. The machine learning programs may utilize deep learning algorithms that may be primarily focused on pattern recognition, and may be trained after processing multiple examples. The machine learning programs may include Bayesian Program Learning (BPL), voice recognition and synthesis, image or object recognition, optical character recognition, and/or natural language processing—either individually or in combination. The machine learning programs may also include natural language processing, semantic analysis, automatic reasoning, and/or machine learning.

Supervised and unsupervised machine learning techniques may be used. In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract data about infrastructures and users associated with a building to detect events and correlations between detected events to identify trends.

Based upon these analyses, the processing element may learn how to identify characteristics and patterns that may then be applied to analyzing image data, model data, and/or other data. For example, the processing element may learn to identify the category and/or one or more errors in an image. The processing element may also learn how to identify rendering errors that may not be readily apparent based upon image data.

The methods and system described herein may be implemented using computer programming or engineering techniques including computer software, firmware, hardware, or any combination or subset. As disclosed above, at least one technical problem with prior systems is that there is a need for systems for a cost-effective and reliable manner for analyzing data to predict events. The system and methods described herein address that technical problem. Additionally, at least one of the technical solutions provided by this system to overcome technical problems may include: (i) improved analysis of images; (ii) increased categorization of images; (iii) improved speed of analysis of images; (iv) more accurate classification; and (v) more accurate error analysis of images.

The methods and systems described herein may be implemented using computer programming or engineering techniques including computer software, firmware, hardware, or any combination or subset thereof, wherein the technical effects may be achieved by performing at least one of the following steps: (a) store a first training set of images, wherein each image of the first training set of images is associated with an image category of a plurality of image categories; (b) analyze each image of the first training set of images to determine one or more features associated with each of the plurality of image categories; (c) receive a second training set of images, wherein the second training set of images includes one or more errors; (d) analyze each image of the second training set of images to determine one or more features associated with an error category; (e) generate a model to identify each of the image categories based on the analysis such that the model includes the error category in the plurality of image categories; (f) receive an image, wherein the image includes an image category of the plurality of image categories; (g) execute the model to analyze the received image; (h) identify an image category of the plurality of image categories for the image based on the execution of the model; (i) compare the identified image category to the included image category to determine if there is a match; (j) if there is a match, approve the image; (k) if there is not a match, flag the image for further review; (l) update the model based on results of the further review; (m) identify one or more errors in the image based on a comparison of the plurality of features in the image and the one or more features associated with the error category, wherein the image includes plurality of features, wherein the error category includes a plurality of sub-categories, wherein each sub-category identifies a different error; (n) identify the image category based on a comparison of the plurality of features in the image and the one or more features associated with the plurality of image categories; (o) assign the image to error category when the image does not fit into any other of the plurality of image categories; (p) receive a plurality of images, wherein each image includes a metadata image category; (q) execute the model for each image of the plurality of images; (r) associate an image category of the plurality of image categories with each image of the plurality of images; and (s) determine if the associated image category matches the corresponding metadata image category.

The technical effects may also be achieved by performing at least one of the following steps: (a) receiving an image, wherein the image includes an image category of the plurality of image categories, wherein the image includes plurality of features; (b) executing a model for categorizing images into an image category of the plurality of image categories, wherein the model includes a plurality of features for each image category of the plurality of image categories; (c) identifying an image category for the image based on the model; (d) comparing the identified image category to the included image category to determine if there is a match; (e) if there is a match, approving the image; (f) if there is not a match, flagging the image for further review; (g) identifying the image category based on a comparison of the plurality of features in the image and the plurality of features associated with the plurality of image categories; (h) identifying at least one error in the image based on the comparison; (i) assigning the image to error category when the image does not fit into any other of the plurality of image categories, wherein the plurality of image categories include an error category; (j) updating the model based on results of the further review; (k) training the model with a plurality of images with errors; (l) storing a first training set of images, wherein each image of the first training set of images is associated with an image category of the plurality of image categories; (m) analyzing each image of the first training set of images to determine one or more features associated with each of the plurality of image categories; (o) generating the model to identify each of the image categories based on the analysis; (p) receiving a second training set of images, wherein a subset of the second training set of images includes one or more errors; and (q) updating the model with the second training set of images such that the model includes an error category in the plurality of image categories.

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium. Additionally, the computer systems discussed herein may include additional, less, or alternate functionality, including that discussed elsewhere herein. The computer systems discussed herein may include or be implemented via computer-executable instructions stored on non-transitory computer-readable media or medium.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
a computing device comprising at least one processor in communication with at least one memory device, wherein the at least one processor is programmed to:
store a first training set of images, wherein each image of the first training set of images is associated with an image category of a plurality of image categories;
analyze each image of the first training set of images to determine one or more features associated with each of the plurality of image categories;
receive a second training set of images, wherein the second training set of images includes one or more errors;
analyze each image of the second training set of images to determine one or more features associated with an error category, wherein the error category includes a plurality of sub-categories, wherein each sub-category identifies a different error; and
generate a model to identify each of the image categories based on the analysis such that the model includes the error category in the plurality of image categories.

2. The system of claim 1, wherein the at least one processor is further programmed to:
receive an image, wherein the image belongs to an image category of the plurality of image categories;
execute the model to analyze the received image; and
identify an image category of the plurality of image categories for the image based on the execution of the model.

3. The system of claim 2, wherein the at least one processor is further programmed to:
compare the identified image category to the included image category to determine if there is a match;
if there is a match, approve the image; and
if there is not a match, flag the image for further review.

4. The system of claim 3, wherein the at least one processor is further programmed to update the model based on a result of the further review.

5. The system of claim 2, wherein the image includes plurality of features and where the at least one processor is further configured to identify one or more errors in the image based on a comparison of the plurality of features in the image and the one or more features associated with the error category.

6. The system of claim 2, wherein the image includes plurality of features and wherein the at least one processor is further programmed to identify the image category based on a comparison of the plurality of features in the image and the one or more features associated with the plurality of image categories.

7. The system of claim 6, wherein the at least one processor is further programmed to assign the image to error category when the image does not fit into any other of the plurality of image categories.

8. The system of claim 2, wherein the at least one processor is further programmed to:
receive a plurality of images, wherein each image includes a metadata image category;
execute the model for each image of the plurality of images;
associate an image category of the plurality of image categories with each image of the plurality of images; and
determine if the associated image category matches the corresponding metadata image category.

9. The system of claim 1, wherein the first training set of images and the second training set of images include terminal charts.

10. A method for categorizing images, the method implemented by a computer device comprising at least one processor in communication with at least one memory device, the method comprising:
storing a first training set of images, wherein each image of the first training set of images is associated with an image category of a plurality of image categories;
analyzing each image of the first training set of images to determine one or more features associated with each of the plurality of image categories;
receiving a second training set of images, wherein the second training set of images includes one or more errors;
analyzing each image of the second training set of images to determine one or more features associated with an error category, wherein the error category includes a plurality of sub-categories, wherein each sub-category identifies a different error; and
generating a model to identify each of the image categories based on the analysis such that the model includes the error category in the plurality of image categories.

11. The method of claim 10 further comprising:
receiving an image, wherein the image belongs to an image category of the plurality of image categories;
executing the model to analyze the received image; and
identifying an image category of the plurality of image categories for the image based on the execution of the model.

12. The method of claim 11 further comprising:
comparing the identified image category to the included image category to determine if there is a match;
if there is a match, approving the image; and
if there is not a match, flagging the image for further review.

13. The method of claim 12 further comprising updating the model based on a result of the further review.

14. The method of claim 11, wherein the image includes plurality of features and wherein the method further comprises identifying one or more errors in the image based on a comparison of the plurality of features in the image and the one or more features associated with the error category.

15. The method of claim 11, wherein the image includes plurality of features and wherein the method further comprises identifying the image category based on a comparison of the plurality of features in the image and the one or more features associated with the plurality of image categories.

16. The method of claim 15 further comprising assigning the image to error category when the image does not fit into any other of the plurality of image categories.

17. The method of claim 10 further comprising:
receiving a plurality of images, wherein each image includes a metadata image category;
executing the model for each image of the plurality of images;
associating an image category of the plurality of image categories with each image of the plurality of images; and determining if the associated image category matches the corresponding metadata image category.

18. A non-transitory computer-readable storage medium comprising executable instructions that, in response to execution, cause a system that comprises a processor, to perform operations comprising:

receiving an image, wherein the image comprises a metadata image category;

executing a model to analyze the received image, wherein the model has been trained by analyzing a first training set of images, wherein each image of the first training set of images is associated with an image category of a plurality of image categories, wherein the analyzing the first training set of images comprises analyzing each image of the first training set of images to determine one or more features associated with each of the plurality of image categories, wherein the model has been further trained to determine one or more features associated with an error category based on analyzing a second training set of images that comprise one or more errors, and wherein the error category includes a plurality of sub-categories, wherein each sub-category identifies a different error;

identifying a first image category of the plurality of image categories for the image based on the execution of the model;

comparing the identified image category to the metadata image category;

in response to determining that the identified image category and the metadata image category satisfy a defined matching criterion, approving the image; and in response to determining that the identified image category and the metadata image category do not satisfy the defined matching criterion, flagging the image for further review.

19. The non-transitory computer-readable storage medium of claim 18, wherein the instructions further cause a system to perform operations comprising update the model based on a result of the further review.

20. The non-transitory computer-readable storage medium of claim 18, wherein the image includes plurality of features and wherein the instructions further cause a system to identify one or more errors in the image based on a comparison of the plurality of features in the image and the one or more features associated with the error category.

* * * * *